Jan. 22, 1963
G. M. BRONSON, SR
FISHING POLE HANDLE ASSEMBLY WITH
ENCLOSED SIGNAL LIGHT MEANS
Filed June 6, 1961
3,074,196
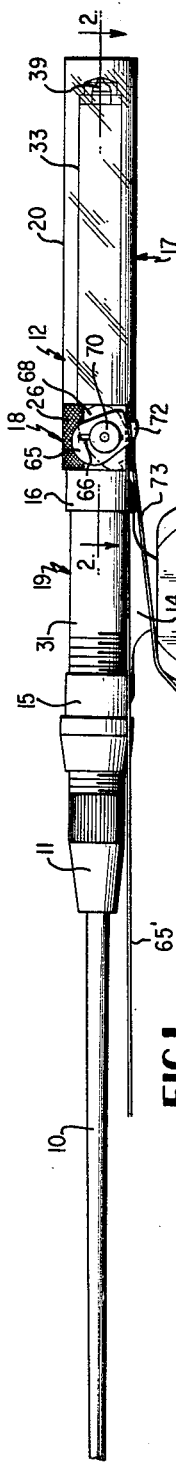
INVENTOR.
GAIL M. BRONSON, SR.
BY
B. P. Fishburne, Jr.
ATTORNEY United States Patent Office 3,074,196
Patented Jan. 22, 1963

3,074,196
FISHING POLE HANDLE ASSEMBLY WITH ENCLOSED SIGNAL LIGHT MEANS
Gail M. Bronson, Sr., Elgin, Ill.
(18 Lincoln St., Algonquin, Ill.)
Filed June 6, 1961, Ser. No. 115,117
4 Claims. (Cl. 43—17)

This invention relates broadly to fishing tackle and more particularly to a handle construction for fishing poles and the like.

A primary object of the invention is to provide a handle assembly for fishing poles, adapted to serve the threefold purpose of a flashlight, signal light to facilitate nighttime fishing, and a storage receptacle for spare parts, batteries, light bulbs, fish hooks or the like.

A further important object of the invention is to provide a fishing pole handle of the above-mentioned character which is sectional in construction for ease of assembly and maintenance, and wherein the flash and signal light means are fully enclosed in a water tight transparent portion of the handle, with simplified and positive control means operated directly by the fishing line for energizing the signal light to alert the fisherman to a bite on the fish hook or bait.

Another object of the invention is to provide simplified and durable means including a rotary cam element operated by tension on the fishing line for grounding the current from a storage battery or batteries to thereby illuminate a signal light within the transparent handle when the fish strikes or takes the hook, and including a rotary element which immediately releases the fishing line after the signal light is activated, so that the line is free to be wound upon the reel for landing the fish.

Another object of the invention is to provide means for adjusting or regulating the amount of line tension required to activate the signal light, so as to compensate for fishing in a strong current of water, where a too sensitive connection between the line and signal light activating means might cause illumination of the signal light prior to the desired time as when the fish strikes.

Still another object is to provide a fishing pole handle assembly of the above-mentioned character which constitutes a self-contained unit readily detachable from the pole, and which is highly compact, neat and attractive in appearance and substantially free of external projections or mechanism likely to foul the line or be generally inconvenient to the fisherman.

Another object is to provide a fishing pole handle having all of the above enumerated features and advantages, and which is adapted for use with substantially any conventional pole and fishing reel without altering the structure of the latter.

Other objects and advantages of the invention will become apparent during the course of the following description.

In the accompanying drawings forming a part of this application and in which like numerals are employed to designate like parts throughout the same, FIGURE 1 is a side elevation of a fishing pole and reel equipped with the handle assembly according to the present invention, FIGURE 2 is an enlarged central vertical longitudinal section taken approximately on line 2—2 of FIGURE 1, FIGURE 3 is a fragmentary central vertical longitudinal section taken on line 3—3 of FIGURE 2, FIGURE 4 is an exploded perspective view of rotary actuator means and associated elements for the enclosed signal and flash light means of the handle assembly.

In the drawings, wherein for the purpose of illustration is shown a preferred embodiment of the invention, the numeral 10 designates any conventional fishing pole or rod, adapted to be detachably secured within the conventional adjustable chuck 11 of the handle assembly 12 which forms the subject matter of the present invention. A conventional fishing reel 13 carries the usual mounting bracket or foot 14 for detachable connection with a forward adjustable ferrule 15 and a rear fixed ferrule 16 on the handle assembly 12. The ferrules 15 and 16 are conventional and common to most fishing pole handles and the screw-threaded adjustability of the forward ferrule 15 allows the handle assembly to accommodate various types and sizes of reels, as is well known.

The handle assembly 12 proper constituting the subject matter of this invention comprises a rear handle section 17 which contains the flash and signal light means, an intermediate light actuating and connector section 18, and a forward storage compartment section 19 immediately rearwardly of the chuck 11.

The rear handle section 17 comprises an elongated cylinder 20 of one piece construction and formed of clear lucite or like transparent plastics material. If prepared, the cylinder 20 may be formed of colored translucent material, and if preferred, only the rear end portion of the cylinder 20 need be formed of transparent or translucent material, as will become further apparent. The cylinder 20 has a central longitudinal cylindrical bore 21 for receiving a battery and light bulb unit to be described. The rear end of the bore 21 is recessed at 22 to accommodate the light bulb, and the cylinder 20 includes a rear end wall 23, integral therewith for completely enclosing and shielding the light bulb and storage battery unit in a water tight and substantially shock-proof manner. At its forward end, the cylinder 20 is internally screw-threaded at 24, and this screw-threaded bore portion of the cylinder 20 opens through the forward end 25 of the cylinder, as shown.

The intermediate section 18 of the handle assembly 12 comprises a metallic and preferably aluminum cylindrical adapter or block 26, which is preferably externally knurled for convenient grasping. An integral rear tubular externally screw-threaded extension 27 on the block 26 engages detachably within the screw-threaded bore portion 24 of cylinder 20, as shown. The internal diameter of the tubular extension 27 is preferably equal to the diameter of the cylinder bore 21. When the cylinder 20 is screwed up tightly on the screw-threaded extension 27, the forward end 25 of the cylinder abuts the rear flat end face 28 of the block 26 to establish a firm connection between the cylinder 20 and metallic block 26. The block 26 carries an integral forward externally screw-threaded extension 29 for detachable connection within the rear internally screw-threaded portion 30 of a spare parts storage tube 31, constituting the previously-mentioned forward section 19 of the handle assembly. When the tube 31 is tightened upon the screw-threaded extension 29, its rear end abuts the forward flat end face 32 of the block 26, as shown in the drawings. The fixed ferrule 16, previously described, is fixedly mounted upon the rear end portion of the tube 31 adjacent the forward side of the block 26 as shown in FIGURE 2. The forward end of the tube 31 adjacent the chuck 11 is closed or walled-off so that this tube may constitute a storage receptacle or chamber for fish hooks, spare light bulbs, batteries or other such parts in the intermediate handle portion between the conventional rod chuck 11 and the block 26.

Disposed removably within the bore 21 of cylinder 20 is a battery and light bulb unit with built-in contact or grounding means, comprising a metallic tube casing 33 which may fit snugly yet removably within the bore 21. The tube casing 33 has an integral forward end wall 34 provided with a central opening 35. The rear end of the tube casing 33 is open and formed to provide screw-threads 36 for the detachable reception of a metallic screw-threaded closure plug 37, in turn carrying a metallic screw-threaded tubular socket 38 to receive detachably the outer screw-threaded terminal of a small light bulb 39. The inner terminal 40 of light bulb 39 bears against one terminal of a first dry cell storage battery 41, disposed within the tube casing 33. A second dry cell storage battery 42 is preferably provided within the tube casing 33 in series engagement with the battery 41, as shown. Obviously, any preferred number of storage batteries may be employed in the handle assembly and the cylinder 20 may be made longer or shorter to accommodate a greater or lesser number of batteries as desired.

A cylindrical metallic cup element 43 having a rear wall 44 and a forward end flange 45 is held firmly against the forward end wall 34 of tube casing 33 by a relatively strong compressible coil spring 46 which surrounds the cup element 43 and has its forward end bearing against the back of flange 45 and its rear end engaging a lug 47 struck radially inwardly from the material of the side wall of tube casing 33. The rear wall 44 of the cup element 43 has a central opening similar to the opening 35 and in axial alignment therewith, FIGURE 2. A contact pin 48 is disposed slidably through the opening 35 and through the aligned opening of the cup wall 44 and this contact pin has an integral annular collar 49 disposed within the bore of the cup element 43, as shown. A compressible coil spring 50, somewhat weaker or lighter than the coil spring 46, surrounds the contact pin 48 between the collar 49 and cup wall 44 and constantly urges the contact pin forwardly toward the block 26. The rear end 51 of the contact pin is thus urged by the spring 50 away from current grounding engagement with the central terminal 52 of battery 42. The contact pin 48 is adapted to be axially shifted rearwardly by cam means to be described into contact with the battery terminal 52 for grounding the battery current and completing the circuit through the filament of the light bulb 39 when the fish strikes the line, as will be more fully described.

The block 26 has an axial opening 53 receiving the forward rounded nose 54 of the contact pin 48, and a conical recess 55 in the rear end of the block 26 leads from the opening 53 to the bore of the tubular screw-threaded extension 27 and receives the forward end of the tube casing 33, as shown in FIGURE 2. The block 26 has a transverse screw-threaded bore 56 opening through one side thereof and intersecting the opening 53. This screw-threaded bore 56 receives a screw-threaded plug 57 having a cross slot 58 to facilitate adjusting the same with a screw driver or the like. The plug 57 has an inner bore or recess 59 and an outer reduced cylindrical bore portion 60, receiving rotatably a cam shaft or pin 61, having an inner pin extension 62, journaled for rotation within a cylindrical recess 63 formed within the block 26. Within the opening 53 of block 26, the cam shaft 61 carries an integral eccentric cam 64 for engagement with the forward rounded nose 54 of contact pin 48. When the cam shaft 61 is turned upon its longitudinal axis by means to be described, in response to tension upon the fishing line 65', the eccentric cam 64 shifts the contact pin rearwardly against the force of the spring 50 and into current grounding engagement with the battery terminal 52 to energize the light bulb 39. Continued rotation of the cam shaft 61 and cam 64 will release the contact pin 48 so that the spring 50 may automatically return the contact pin forwardly or away from the battery terminal 52 to interrupt the circuit through the light bulb filament.

A flat actuator disc 65 has an adjusting slot 66, slidably receiving a flattened portion 67 on cam shaft 61. A flat face 68, FIGURE 1, on the adjacent side of block 26 accommodates the disc 65 so that the same does not project appreciably beyond the diameter of the cylinder 20 and block 26. The flat faces on the shaft 61 provide shoulders 69 thereon for the seating of the disc 65 in slightly spaced relation to the block flat face 68. A nut 70 has screw-threaded engagement with an outer screw-threaded extension 71 on the cam shaft 61, outwardly of the flattened portion 67. The nut bears upon the actuator disc 65 and clamps the same slightly against the shoulders 69 when the disc is adjusted in the desired manner through the medium of the slot 66. The disc 65 has a cam or hook extension 72 integral therewith for detachable engagement with a loop 73 of the fishing line 65', where the same emerges from the reel 13, FIGURE 1. The line loop 73 engages the extension 72 as shown in FIGURE 1, and the line 65' then extends forwardly along the handle and fishing pole 10 and through the conventional guide means not shown. The disc 65 is somewhat elongated or oval-shaped as shown in the drawings so that it may be manipulated by the fingers as well as by the fishing line, to facilitate the use of the handle assembly as a portable flashlight. The adjusting slot 66 is diagonal to the longitudinal axis of the oval-shaped disc, and the displacement of the hook extension 72 from the central axis of the cam shaft 61 may be varied through a considerable range by adjusting the disc 65 on the shaft 61 by means of the slot 66 and the coacting flattened shaft portion 67. To adjust the disc 65, it is merely necessary to loosen the nut 70 and shift the disc in either direction lengthwise of the slot 66 and then tighten the nut 70 to secure the disc to the selected adjusted position. The distance of the extension 72 from the center of the cam shaft 61 regulates or controls the degree of tension on the fishing line 65' that is necessary to activate the signal light bulb 39. That is to say, when the hook extension 72 is close to the center of the shaft 61, a relatively large tension on the line 65' is required to turn the shaft 61 and actuate the contact pin 48 through the medium of the cam 64. When the hook extension 72 is spaced a greater distance from the center of the shaft 61, a lesser degree of tension on the line 65' will turn the cam shaft 61 and cam and actuate the contact pin 48 for grounding the battery current and illuminating the light bulb 39.

The use or operation of the handle assembly is as follows:

The entire handle assembly 12 including the sections 17, 18 and 19 and the chuck 11 is removable as a unit from the pole 10. The reel 13 may be bodily removed from the handle assembly by merely adjusting the movable ferrule 15. Once removed, as a unit, the handle assembly 12 may be used as a portable flashlight and for storing fish hooks, spare light bulbs, batteries and the like within the storage tube 31 as previously explained. To use the handle assembly 12 as a flashlight, the actuating disc 65 is merely turned with the thumb or finger while holding the handle assembly 12 in the hand with the light bulb 39 directly toward the tackle box or any other object which it is desired to illuminate. When the disc 65 is turned sufficiently to cause the eccentric cam 64 to shift the contact pin 48 into engagement with the battery terminal 52, the circuit through the light bulb filament is complete and the light bulb will glow and light is transmitted through the lucite cylinder 20 whose rear end 23 may serve somewhat as a projecting lens.

When the handle assembly 12 is secured to the pole 10 through the medium of the chuck 11, and when the reel 13 is secured in place upon the handle assembly as shown in FIGURE 1, the device may be used during night fishing and the fisherman will receive a visual signal by the flashing of the light bulb 39 when the fish strikes the line, takes the bait or takes the hook. Whenever the line 65' is thus tensioned, and with the line loop 73 engaging the extension 72 of the disc 65, the disc will be turned with the shaft 61 upon the axis of the latter, and the eccentric cam 64 will engage the contact pin 48 and shift the same into contact with the battery terminal 52 to energize the light bulb 39 in the manner previously explained. As the cam 64 passes over the rounded nose 54 of the pin 48, the light bulb will flash to alert the fisherman. Continued tension on the line 65' will move the eccentric cam 64 away from engagement with the contact pin 48 and the return spring 50 will immediately disengage the contact pin from the battery terminal 52 and interrupt the circuit through the light bulb filament.

As soon as the disc 65 rotates sufficiently far to energize the signal light bulb 39, as to the position shown in broken lines in FIGURE 1, the line loop 73 will slip off of the extension 72 and be freed therefrom and the fisherman may immediately reel in the line 65' without stopping to disconnect the line from the signaling means. This is an important feature of the present invention which adds materially to preventing the fish from escaping after a strike is made and after the signal light is energized. As soon as the signal light flashes to alert the fisherman, the line automatically disengages the actuating disc 65 and is immediately ready to be reeled in by the fisherman through operation of the reel 13. To prepare the line for the next strike during night fishing, the disc 65 is returned manually to the position shown in full lines in FIGURE 1, and the line loop 73 is again engaged with the hook extension 72 and the rod or pole may be placed aside or held while awaiting the next strike. When the actuator disc 65 is positioned as shown in full lines in FIGURE 1, the cam 64 may be bearing against the forward end of the contact pin 48 but not turned sufficiently to shift the contact pin against the battery terminal 52. When the line 65' is tensioned due to a strike by the fish, the disc 65 will turn clockwise in FIGURE 1 to energize the light bulb 39 and immediately thereafter release the line for reeling in, as above-described. The cam 64 merely trips over the rounded forward nose 54 of the pin 48 during a complete rotation of the cam. When the eccentric portion of the cam 64 clears the nose of the pin 48, the spring 50 serves to hold the contact pin 48 away from contact with the battery terminal 52 and the light bulb 39 is de-energized until the high part of the cam 64 again actuates the contact pin 48.

The entire battery and light bulb unit including the tube casing 33, pin 48 and associated elements is removable bodily from the cylinder 20 when the same is detached from the screw-threaded extension 27 of the block 26. When the parts are assembled together as in FIGURES 1 and 2, the light bulb, battery and substantially all parts of the device are fully enclosed and protected from the water and the elements in a substantially shock-proof manner. The construction is highly compact and there are no projections on the handle assembly except the usual reel 13 and the flat disc 65 which lies close to the side of the handle and substantially against the flat face 68 on the block 26. This is an advantage in convenience to the fisherman and in the appearance or attractiveness of the handle assembly.

The feature of adjustability of the disc 65 by means of the slot 66 and associated elements is another important feature of the invention, which provides for varying the effective tension on the line 65' ncessary to trip the contact pin 48 and energize the signal light bulb 39, as previously fully explained.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A substantially fully enclosed waterproof signal light means for fishing pole handles, said means and handle being substantially smooth exteriorly and substantially free of lateral projections, said means comprising a tubular elongated handle body portion having one end closed and its opposite end open and internally screw-threaded and formed of translucent material at least at said closed end, a signal light and battery unit disposed within said handle body portion and substantially fully enclosed and protected thereby, said signal light disposed near said closed end of the handle body portion, said battery unit having a terminal near and inwardly of the open end of the handle body portion, a reciprocatory contact pin carried by said light and battery unit adjacent the open end of the handle body portion, spring means connected with said contact pin and normally maintaining it spaced axially from said battery terminal with the forward end of said pin projecting forwardly of said unit and handle body portion, a metallic handle connector portion of approximately the same diameter as the handle body portion arranged forwardly thereof and abutting the open end of the same and having an axial tubular screw-threaded extension engageable with the screw-threads of the handle body portion and receiving and enclosing the adjacent end of said unit and said contact pin, said handle connector portion having an internal chamber receiving the forward end of the contact pin and a side opening extending at right angles to said unit and contact pin, a cam shaft journaled for rotation within said side opening in close fitting relation thereto and projecting a short distance only beyond one side of the handle connector portion, an eccentric cam on said cam shaft within said chamber and intermittently engageable with the forward end of the contact pin during rotation of the cam shaft to shift the rear end of the pin into grounding engagement with said battery terminal and thereby causing flashing of the signal light, and a substantially flat disc element secured to said cam shaft exteriorly of said handle connector portion and close to one side thereof and having a single hook extension for detachable connection with a fishing line, tension on the fishing line causing rotation of said disc element and cam shaft.

2. The invention as defined by claim 1, and wherein said cam shaft has a flattened portion exteriorly of the handle connector portion and said disc element is provided with a slot slidably receiving said flattened portion to facilitate adjusting the disc laterally of the cam shaft, said hook extension disposed near one end of the slot, and a nut on the outer end of the cam shaft engaging said disc to clamp the same in the selected adjusted position upon the cam shaft.

3. The invention as defined by claim 2, and wherein said disc is oblong and said slot extends diagonally of the major axis of said disc.

4. A fishing pole handle and signal light assembly of waterproof construction and substantially free of external projections and comprising an elongated tubular handle body portion having a closed end and an open internally screw-threaded end and being translucent at least adjacent the closed end, a signal light and battery unit enclosed within the bore of said body portion with the signal light adjacent the closed end of the body portion and having a battery terminal near and inwardly of said open end of the body portion, resilient axially shiftable contact means on the end of said unit adjacent said open end and projecting forwardly of said body portion and unit and biased normally out of engagement with said terminal, a metallic handle portion abutting the open end of said body portion and having a screw-threaded tubular extension engaging the internal screw-threads of the body portion and telescoped over the adjacent end of said unit in close fitting relation thereto, said metallic handle portion having an axial opening receiving the forward end of the contact means movably and having a side opening leading into the axial opening thereof, and rotary means journaled within the side opening of the metallic handle portion in close fitting relation thereto and adapted to intermittently engage said contact means to shift the same axially into engagement with said battery terminal to cause flashing of the signal light upon turning of the rotary means, said rotary means projecting a slight distance only beyond one side of the metallic handle portion and adapted for releasable connection with a fishing line whose tension serves to turn the rotary means.

References Cited in the file of this patent

UNITED STATES PATENTS

| | | |
|---|---|---|
| 1,267,248 | Monighan | May 21, 1918 |
| 2,195,692 | Bushey | Apr. 2, 1940 |
| 2,349,077 | Comparelli | May 16, 1944 |
| 2,409,988 | Schwebs | Oct. 22, 1946 |
| 2,574,333 | Kuczynski et al. | Nov. 6, 1951 |
| 2,978,828 | McQuiston et al. | Apr. 11, 1961 |

FOREIGN PATENTS

| | | |
|---|---|---|
| 9,117 | Great Britain | 1899 |